US010038852B2

(12) United States Patent
Kim et al.

(10) Patent No.: US 10,038,852 B2
(45) Date of Patent: Jul. 31, 2018

(54) IMAGE GENERATION METHOD AND APPARATUS HAVING LOCATION INFORMATION-BASED GEO-STICKER

(71) Applicant: SEERSLAB, INC., Seoul (KR)

(72) Inventors: Jae Cheol Kim, Seoul (KR); Jin Wook Chong, Seoul (KR)

(73) Assignee: SEERSLAB INC., Seoul (KR)

( * ) Notice: Subject to any disclaimer, the term of this patent is extended or adjusted under 35 U.S.C. 154(b) by 88 days.

(21) Appl. No.: 15/338,364

(22) Filed: Oct. 29, 2016

(65) Prior Publication Data

US 2017/0257575 A1    Sep. 7, 2017

(30) Foreign Application Priority Data

Mar. 7, 2016 (KR) ................. 10-2016-0026846

(51) Int. Cl.
*H04W 4/021* (2018.01)
*H04N 5/232* (2006.01)
*G06T 7/00* (2017.01)
*G06T 11/60* (2006.01)

(52) U.S. Cl.
CPC ....... *H04N 5/23293* (2013.01); *G06T 7/0081* (2013.01); *G06T 11/60* (2013.01); *H04W 4/021* (2013.01); *G06T 2201/0051* (2013.01)

(58) Field of Classification Search
CPC . H04N 5/23293; H04W 4/021; G06T 7/0081; G06T 11/60; G06T 2201/0051
See application file for complete search history.

(56) References Cited

U.S. PATENT DOCUMENTS

| 2008/0270235 | A1* | 10/2008 | Yoon | G06Q 30/02 705/14.58 |
| 2009/0264070 | A1* | 10/2009 | Lim | G06Q 30/0261 455/41.2 |
| 2011/0029370 | A1* | 2/2011 | Roeding | G06Q 30/00 705/14.38 |
| 2012/0311623 | A1* | 12/2012 | Davis | H04N 5/765 725/18 |

OTHER PUBLICATIONS https://en.wikipedia.org/wiki/Shopkick (Shopkick founded 2009).*

* cited by examiner

*Primary Examiner* — Hung Lam
(74) *Attorney, Agent, or Firm* — Maschoff Brennan (57) ABSTRACT

Disclosed herein are an image generation method and apparatus having a location information-based geo-sticker. The image generation method includes displaying a subject to be captured by a camera by executing a camera application on a user device, acquiring information about a location of the user device and determining whether the location of the user device based on the acquired location information is present in a predetermined area, if it is determined that the location of the user device is present in the predetermined area, receiving geo-items including at least one of a sticker and an effect corresponding to information about the predetermined area from a server; and when an image including the subject is captured using any one item included in the received geo-items, generating an image to which the one item is applied.

19 Claims, 11 Drawing Sheets

IMAGE GENERATION METHOD AND APPARATUS HAVING LOCATION INFORMATION-BASED GEO-STICKER

CROSS REFERENCE TO RELATED APPLICATION

This application claims the benefit of Korean Patent Application No. 10-2016-0026846, filed Mar. 7, 2016, which is hereby incorporated by reference in its entirety into this application.

BACKGROUND OF THE INVENTION

1. Technical Field

The present invention generally relates to image generation technology and, more particularly, to an image generation method and apparatus, which can provide geo-items (or geo-stickers) including stickers and effects corresponding to information about a predetermined area (or geofence) based on the predetermined area information, thus enabling the generation of images to which the geo-items in the corresponding area are applied.

2. Description of the Related Art

At present, most mobile devices are each equipped with a digital camera. Further, a user captures an image using a mobile device equipped with a camera module. Capture image data is image-processed based on technical standards such as Joint Photographic Experts Group (JPEG) or Moving Picture Experts Group 4 (MPEG 4), and is then stored in the memory of the mobile device. The image data stored in the mobile device may be played or displayed on the device and may be transmitted to another device via wireless communication.

In order to play, display or transmit an image file, the mobile device may obtain image data using a digital camera embedded therein. For this operation, the user manipulates the digital camera. When the user initiates the capture of an image, light detected by an image sensor installed in the camera module of the mobile device is converted into an electrical signal. Then, image processing such as the correction of error and distortion and compression is performed using predefined well-known processes of the hardware and software of the camera module, and image processed results are stored in the form of an image file in memory.

SUMMARY OF THE INVENTION

Embodiments of the present invention are intended to provide an image generation method and apparatus, which can provide geo-items (or geo-stickers) including stickers and effects corresponding to information about a predetermined area (or geofence) based on the predetermined area information, thus enabling the generation of images to which the geo-items in the corresponding area are applied.

In accordance with an aspect of the present invention to accomplish the above object, there is provided an image generation method, including displaying a subject to be captured by a camera by executing a camera application on a user device; acquiring information about a location of the user device and determining whether the location of the user device based on the acquired location information is present in a predetermined area; if it is determined that the location of the user device is present in the predetermined area, receiving geo-items including at least one of a sticker and an effect corresponding to information about the predetermined area from a server; and when an image including the subject is captured using any one item included in the received geo-items, generating an image to which the one item is applied.

The image generation method may further include, when the image to which the one item is applied is generated, applying a first watermark, preset for the predetermined area information, to a specific region of the generated image and displaying the first watermark on a screen.

The image generation method may further include, when the first watermark displayed in the specific region is selected by user input, changing the first watermark to a second watermark, preset for the camera application, and displaying the second watermark, wherein the first watermark and the second watermark are changed to each other and then displayed based on user input made in the specific region.

The image generation method may further include, when the user device exits the predetermined area in a state in which execution of the camera application has been terminated, deleting the received geo-items.

The image generation method may further include, when the location of the user device is present in the predetermined area and a promotion corresponding to the predetermined area information is present, displaying a popup window pertaining to the promotion on a screen.

The image to which the one item is applied may be capable of being shared through at least one preset application.

Receiving the geo-items may be configured to, when a preset geo-button is selected by the user, display items included in the geo-items which are capable of being downloaded from the server, and download an item selected by the user from among the displayed items from the server, and generating the image is configured to, when any one of the downloaded items is selected by the user, generate an image to which the selected item is applied by applying the selected item to the subject.

In accordance with another aspect of the present invention to accomplish the above object, there is provided an image generation method, including acquiring information about a location of a user device, without a camera application being executed; when the user device is found to enter an area, predetermined for the camera application, based on the acquired location information, displaying a message indicating entry into the predetermined area on a screen; when the camera application is executed using the message, receiving geo-items including at least one of a sticker and an effect corresponding to information about the predetermined area from a server; and when an image including a subject is captured using any one item included in the received geo-items, generating an image to which the one item is applied.

Displaying the message on the screen may be configured to, when the screen of the user device is in an off state, display a popup message, preset for the predetermined area information, on the screen, and when the screen of the user device is in an on state, display a banner message, preset for the predetermined area information, in a predetermined region on the screen.

The image generation method may further include, if the camera application is executed using the message when a promotion corresponding to the predetermined area information is present, displaying a popup window pertaining to the promotion on the screen.

In accordance with a further aspect of the present invention to accomplish the above object, there is provided an image generation apparatus, including a display unit for displaying a subject to be captured by a camera by executing a camera application on a user device; a determination unit for acquiring information about a location of the user device and determining whether the location of the user device based on the acquired location information is present in a predetermined area; a reception unit for, if it is determined that the location of the user device is present in the predetermined area, receiving geo-items including at least one of a sticker and an effect corresponding to information about the predetermined area from a server; and a generation unit for, when an image including the subject is captured using any one item included in the received geo-items, generating an image to which the one item is applied.

The display unit may be configured to, when the image to which the one item is applied is generated, apply a first watermark, preset for the predetermined area information, to a specific region in the generated image, and display the first watermark on a screen.

The display unit may be configured to, when the first watermark displayed in the specific region is selected by user input, change the first watermark to a second watermark, preset for the camera application, and display the second watermark, and the first watermark and the second watermark may be changed to each other and then displayed based on user input made in the specific region.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention will be described in detail below with reference to the accompanying drawings. However, the present invention is not limited or restricted by the following embodiments. It should be noted that the same reference numerals are used to designate the same elements throughout the drawings.

The gist of embodiments of the present invention is to acquire information about the location of a user device, and when the location information of the user device indicates that the user device has entered a predetermined area, to provide geo-items (or geo-stickers) including stickers (images, icons, etc.) and effects corresponding to information about the predetermined area, which are usable in a camera application, thus enabling the generation of images to which the geo-items in the corresponding area are applied.

Figure 1:
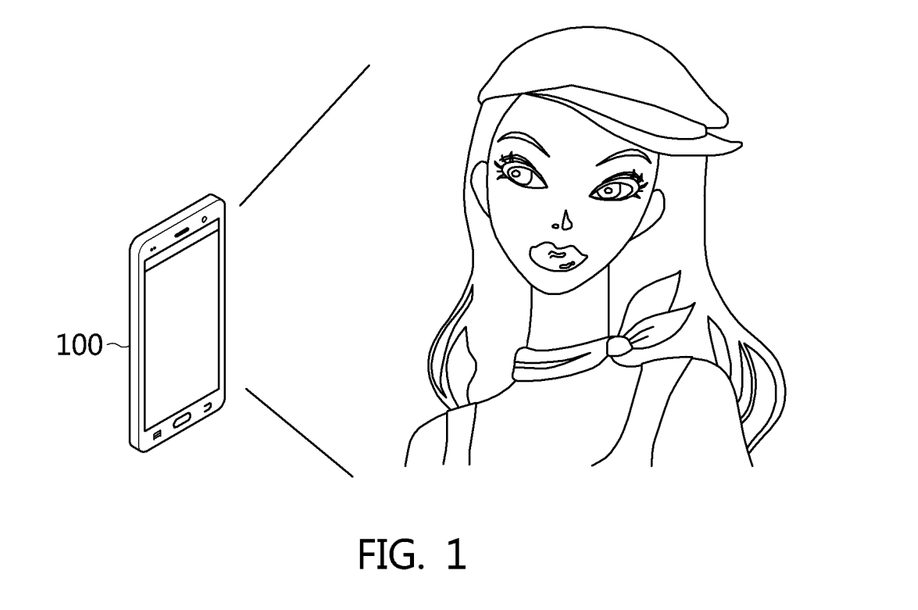
FIG. 1 is an exemplary diagram for explaining the present invention.

FIG. 1 is an exemplary diagram for explaining the present invention.

As shown in FIG. 1, the present invention may be applied to a user device 100 equipped with a camera, for example, a device such as a smart phone, and is installed in the form of an application in the smart phone or the like. Accordingly, when an image of a subject, for example, a picture or a video of the subject, is captured using the camera application in the state in which the user device has entered a predetermined area (hereinafter referred to as a "geofence"), a geo-item including at least one of a sticker and an effect corresponding to the geofence may be received from a server, and the image of the subject may be captured with the geo-item being applied to the subject.

Here, the camera application according to the present invention permits location sharing for the application, so that the location information of the user device 100 in which the camera application is installed is shared with the server, and then the geo-items of the corresponding geofence may be received from the server through location sharing. Of course, the number of geo-items that can be provided from the server may be one or more, and each of the one or more items included in the geo-items may or may not be downloaded depending on the user's selection. That is, when geo-items that can be provided from the geofence include a plurality of items, some items may be downloaded depending on the user's selection, or other items may not be downloaded because the user does not select the items.

Of course, geofence information about the area corresponding to a geofence may be stored only in the server, or in the camera application as well as the server. It will be apparent that, when geofence information is also stored in the camera application, the geofence information may be updated by updating the camera application or the like.

Such geo-items may be applied not only to picture-taking in the geofence area but also to video capture in the area. Further, only geofence items may be applied, or, alternatively, specific effects provided by the camera application, for example, a motion effect or the like, may be additionally applied, with the geofence items being applied.

Therefore, by applying geo-items to the subject in the geofence area, images to which the geo-items are applied may be captured and generated.

The subject in the present invention may include various objects, for example, a person, a building, a vehicle, etc. The locations at which stickers and effects of geo-items applied to image capturing, and effects provided by the camera application, for example, a motion effect, are applied may be determined depending on the item selected by the user and information about the objects included in the subject desired to be captured.

Hereinafter, for the convenience of description, a description will be made on the assumption that, in the present invention, a smart phone equipped with a camera performs the function of the present invention. Of course, those skilled in the art will appreciate that the present invention is not limited to application to such a smart phone, but may be applied to all devices in which the apparatus of the present invention can be mounted.

Figure 2:
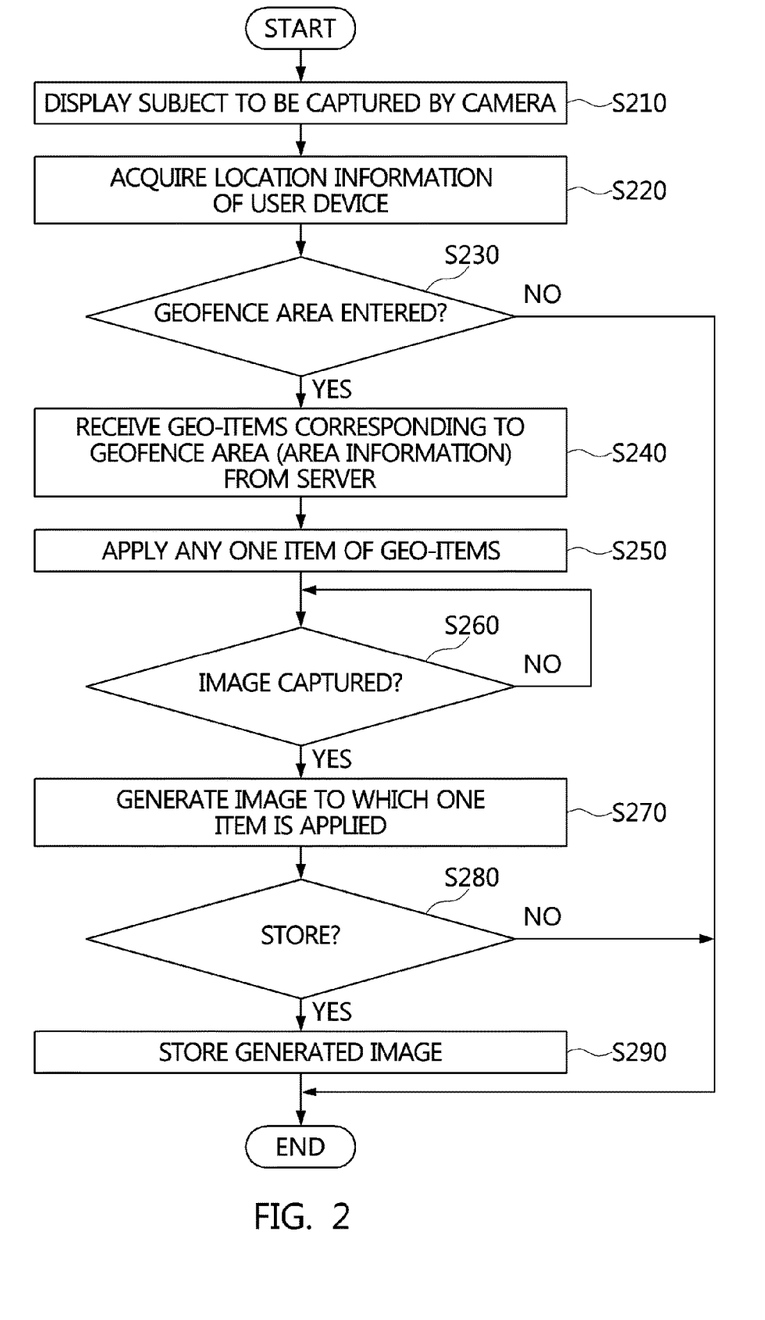
FIG. 2 is an operation flowchart showing an image generation method according to an embodiment of the present invention.

FIG. 2 is an operation flowchart showing an image generation method according to an embodiment of the present invention, and illustrates an operation flowchart corresponding to the case where a user device enters a geofence (area), with a camera application being executed.

Referring to FIG. 2, in the image generation method according to the embodiment of the present invention, when the camera application of the present invention is executed, a subject, for example, a subject including objects such as a vehicle, a landscape, and a person, captured by the camera of a user device in which the camera application is installed, for example, a smart phone, is displayed on the screen at step S210.

Depending on the user's selection, various filter functions may be applied to the subject that is displayed at step S210, and various functions of the camera that captures images of the subject may also be applied.

When the camera application is executed at step S210, information about the location of the user device is acquired using, for example, a Global Positioning System (GPS), and whether the user device has entered a predetermined geofence is determined based on the acquired location information at steps S220 and S230.

Here, geofence information about the area corresponding to the geofence may be stored in the camera application. It is apparent that, in order to determine whether the user device has entered the geofence, the location information of the user device must be permitted in advance to be shared with the camera application. The procedure for sharing the location information of a user device with the camera application in a smart phone in which the camera application is installed, such as a smart phone in which a Google Android Operating System (OS) is used and a smart phone in which Apple iOS is used, will be apparent to those skilled in the art, and thus a description thereof will be omitted.

If it is determined at step S230 that the location of the user device based on the acquired location information is not present in the area enclosed by the predetermined geofence, that is, if the user device has not entered the geofence, an image is captured using an existing image-capturing scheme. This function is apparent to those skilled in the art, and thus a description thereof will be omitted.

On the other hand, if it is determined at step S230 that the location of the user device based on the acquired location information is present in the area enclosed by the predetermined geofence, that is, if the user device has entered the geofence, geo-items preset for the geofence are received from the server at step S240.

Here, at step S240, information indicating that the user device has entered the geofence is displayed on the screen of the camera application as the user device enters the geofence. When a menu item for downloading geo-items corresponding to the geofence from the server is selected by the user, items such as stickers or effects corresponding to the geofence, which can be downloaded from the server, may be displayed, and an item selected by the user may be downloaded from the server.

When any one of the geo-items downloaded at step S240, for example, a sticker or an effect, is selected, the selected item is applied to the object, for example, a person, included in the subject, and an image to which the geo-item is applied is generated when an image of the subject to which the item is applied is captured at steps S250 to S270.

Here, the image to which the geo-item is applied, generated at step S270, may be displayed on the screen using a function such as a preview function before the image is stored, and may be shared with others through at least one predetermined application, for example, a messenger service program such as Line or Kakao Talk, BAND, or a Social Network Service (SNS).

Of course, in the state in which the geo-item is applied, any one of items provided by the camera application regardless of the geofence, for example, any one of motion effects, may be additionally applied depending on the user's selection. In this case, an image to which the geo-item and a basically provided effect are both applied may be captured.

Further, when the geo-item is applied to the subject at step S250, a notification function or a notification indication related to the application of the geo-item may be visually provided to the user so that the user may recognize that the geo-item has been applied.

When the image generated at step S270 is displayed on the screen using a function such as a preview function, the generated image may include at least one of a watermark preset for the corresponding geofence (hereinafter referred to as a "first watermark") and a watermark preset for the camera application (hereinafter referred to as a "second watermark").

In this regard, the watermark included in the generated image may be displayed in a preset specific region of the area of the image. The watermark displayed in the specific region may be changed according to the touch input of the user. For example, when the user touches the specific region while the first watermark is displayed in the specific region of the image, the watermark changes from the first watermark to the second watermark, and the second watermark is displayed. When the user touches the specific region while the second watermark is displayed in the specific region of the image, the watermark changes back from the second watermark to the first watermark, and the first watermark is displayed.

When the image to which the geo-item is applied is generated at step S270, and it is desired to store the image generated with the geo-item applied thereto using user input, the generated image is stored in the corresponding device at steps S280 and S290.

Here, the stored image may include either the first watermark or the second watermark.

The geo-item for the geofence, which is downloaded via the above-described procedure, may be deleted when the user exits the geofence. In this case, when the geo-item is applied while the camera application is being executed, the current session is maintained. When the application of the geo-item is released or the camera application is terminated, that is, when the current session is disconnected, the geo-item may be deleted. In this case, a specific message indicating that the user has exited the corresponding geofence may also be displayed on the screen.

Further, when the user device enters a second geofence close to a first geofence while the camera application is being executed in the first geofence, a message indicating entry into the second geofence may be displayed on the screen. Currently, when the item of the first geofence is still applied, even if the user device enters the second geofence, the current session may be maintained without change.

The above-described procedure of FIG. 2 illustrates the case where the user device enters the geofence while the camera application is being executed, and the method of the present invention may provide information indicating entry into the geofence to the user even while the camera application is not being executed. For example, when the user enters a geofence while the camera application of the user device, which has been granted permission to share location information, is not being executed, a message indicating entry into the geofence may be displayed on the screen of the user device. Simultaneously with the display of the message, a vibration or an alarm may be provided.

Figure 6A:
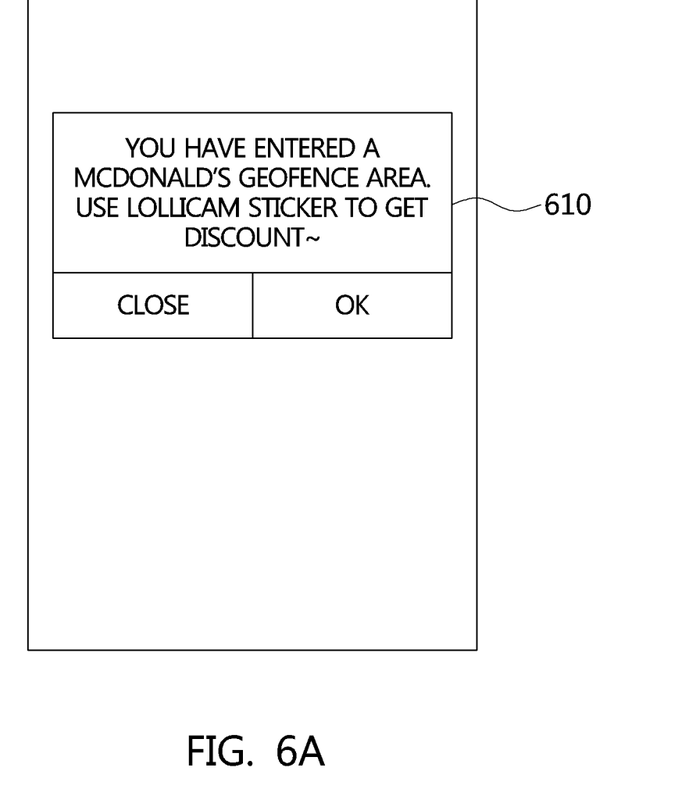
FIGS. 6A and 6B are exemplary diagrams for explaining the case where a user device enters a geofence, without a camera application being executed.

In an embodiment, as shown in FIG. 6A, in the state in which the screen of the user device is turned off, when the user device enters a geofence, for example, a geofence area corresponding to a McDonald's restaurant, information about entry into the McDonald's geofence area and discount information or the like related to the geofence area are provided to the turned-off screen in the form of a text message 610. When the user executes a camera application using the text message 610, in other words, when the user presses an "OK" button, the above-described functions on the camera application related to entry into the geofence may be performed.

Figure 6B:
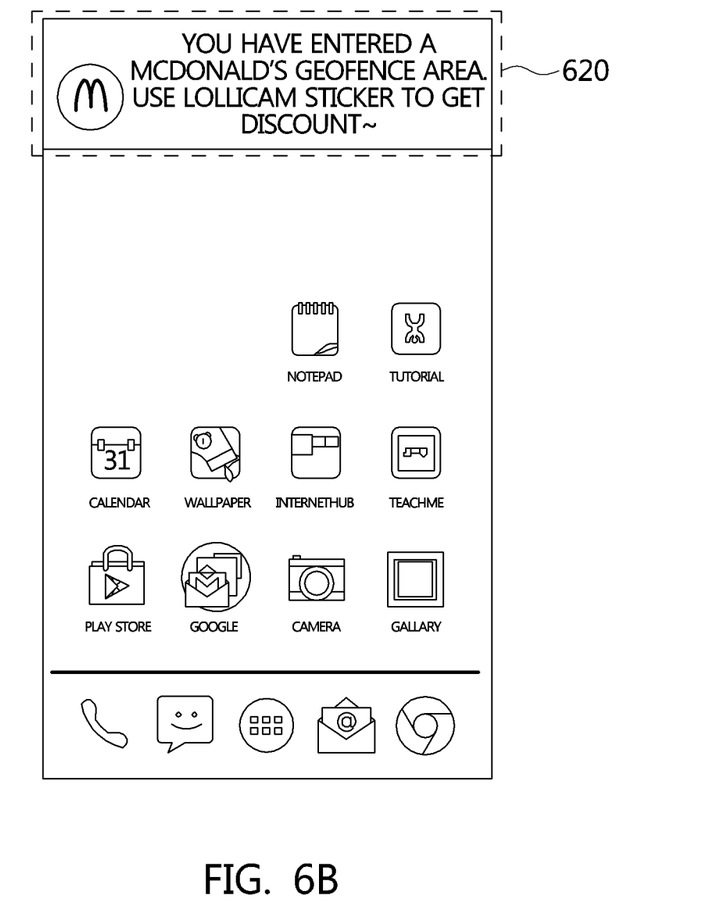

In another embodiment, as shown in FIG. 6B, when the user device enters a geofence, for example, a McDonald's geofence area, in the state in which the screen of the user device is turned on, a banner message 620 containing information about entry into the McDonald's geofence area, discount information for the geofence area, etc. is provided to a portion of the region on the screen, for example, an upper region of the screen. When the user executes the camera application by selecting the banner message 620, the above-described functions on the camera application, which are related to entry into the geofence, may be performed.

As shown in FIGS. 6A and 6B, when the camera application is executed using the message indicating entry into the geofence, a preset specific sticker or effect, among stickers or effects of the geo-items provided for the geofence, may be automatically downloaded.

Further, when the user executes the camera application using a geofence guidance message in the state in which the user has exited the geofence, a text phrase indicating that the user has exited the geofence may be displayed on a normal mode screen.

Of course, text phrases to be displayed on the screen for the above-described entry into and exit from the geofence, respectively, may be set differently for respective geofences. When a new message phrase for a specific geofence is received in the state in which a previous message phrase related to the geofence has already been received, the previous message phrase may be replaced with the new message phrase, or the message phrases for the geofence may be sequentially displayed.

Further, the message phrase for the above-described entry into or exit from the geofence may not be displayed on the screen when the user device visits the geofence again within a predetermined period of time. When the message phrase is changed, or when the item of the geofence is updated, the corresponding message phrase may be displayed on the screen even if the user device visits the geofence again within a predetermined period of time.

The method according to an embodiment of the present invention, performed while the above-described camera application is being executed, will be described in detail with reference to FIGS. 3A to 5B.

Figure 3A:
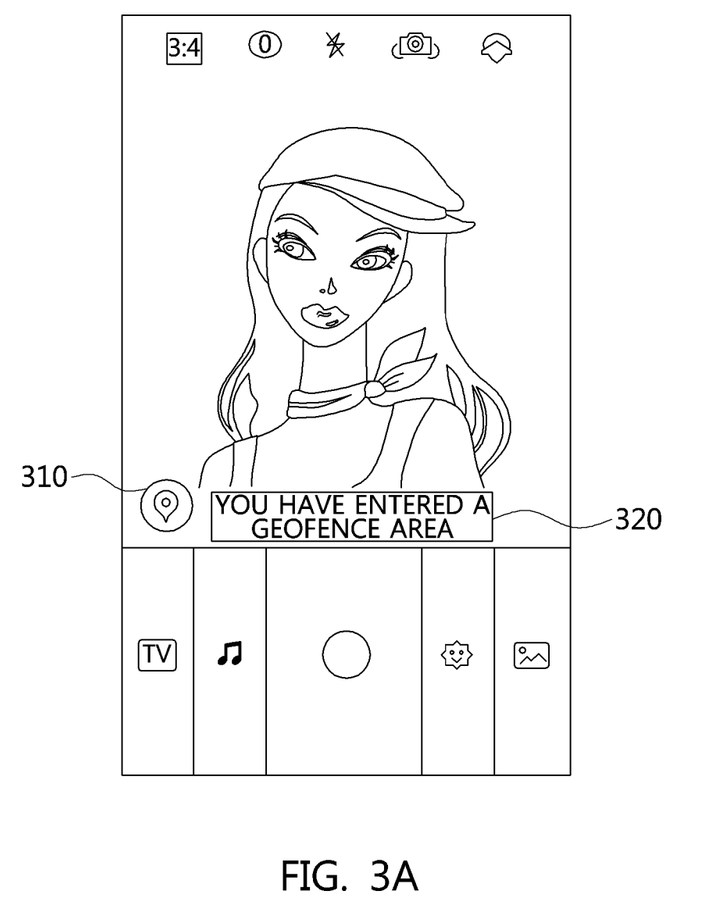
FIGS. 3A and 3B are exemplary diagrams for explaining the case where a user device enters a geofence, with a camera application being executed.

When the camera application for performing the present invention is executed by the user, a subject captured by a camera provided in the device in which the camera application is installed or captured by a camera connected to the device is displayed in a portion of the screen. When the user device enters a predetermined geofence while the camera application is being executed, a message 320 indicating that the user device has entered the geofence is displayed in a portion of the screen, and a geo-button 310 for downloading geo-items in the geofence is displayed in another portion of the screen, as shown in FIG. 3A.

Figure 3B:
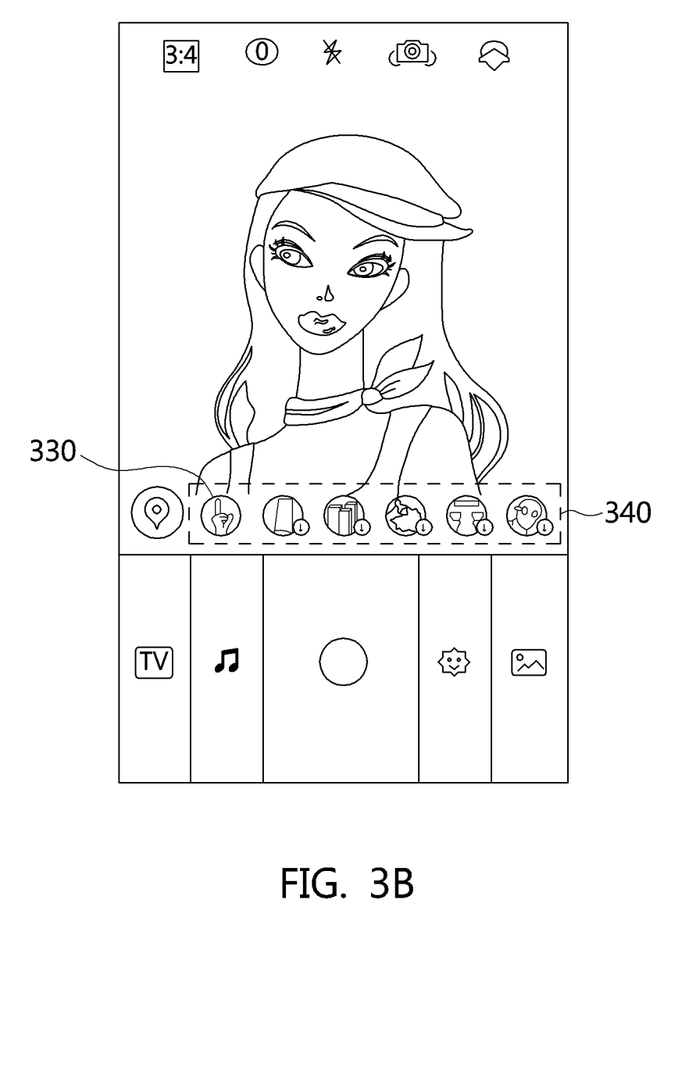

When the user selects the geo-button 310 to download geo-items, a list 340 of items that are set for the geofence is displayed in a portion of the screen in any one direction, as shown in FIG. 3B.

Here, among the items displayed on the screen, a first item 330 may be automatically download when the user device enters the geofence, and the remaining items may be downloaded in such a way that, when the user selects the corresponding item, the selected item is downloaded from the server. When the user swipes a region corresponding to the list of items to the left, additional items may be exposed, but the geo-button may be maintained in a fixed state.

Furthermore, only a predetermined portion of the last item, among the items displayed on the screen, for example, 50% of the item, may be exposed on the right edge of the screen, and thus the presence of additional items may be indicated to the user.

In the corresponding geofence, when the user selects an item desired to be applied from among the items such as the stickers or effects of the downloaded geo-items, the selected item may be processed to be highlighted and may be applied to the subject displayed on the screen. When the applied item is selected again, the application of the item is released.

The geo-items for the geofence may be set such that different interfaces for the application and release of geo-items are used depending on the OS of the corresponding device. This may be determined by the service provider that provides the present technology.

Figure 4A:
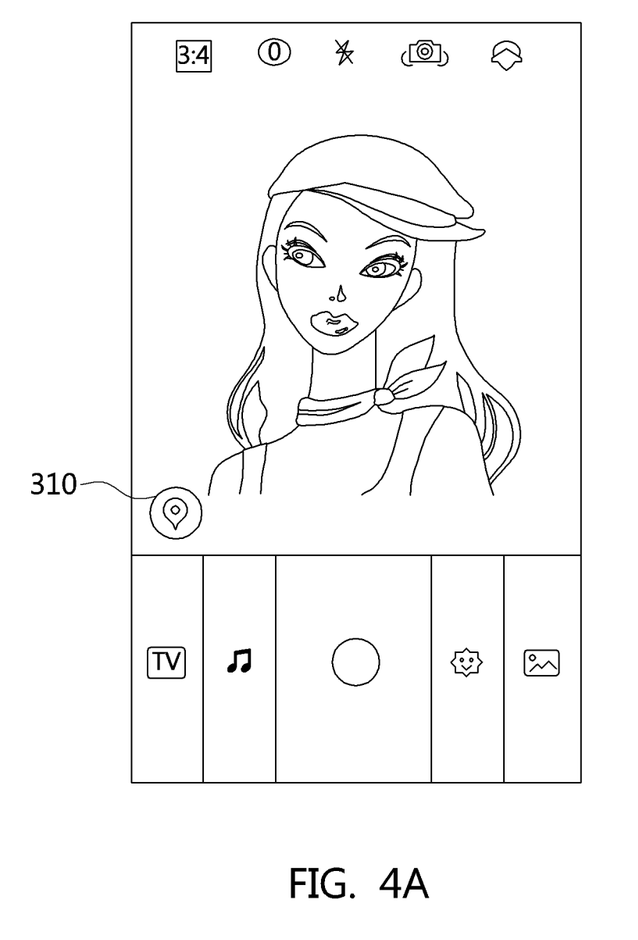
FIGS. 4A and 4B are exemplary diagrams for explaining the case where a promotion is present in the corresponding geofence.
Figure 4B:
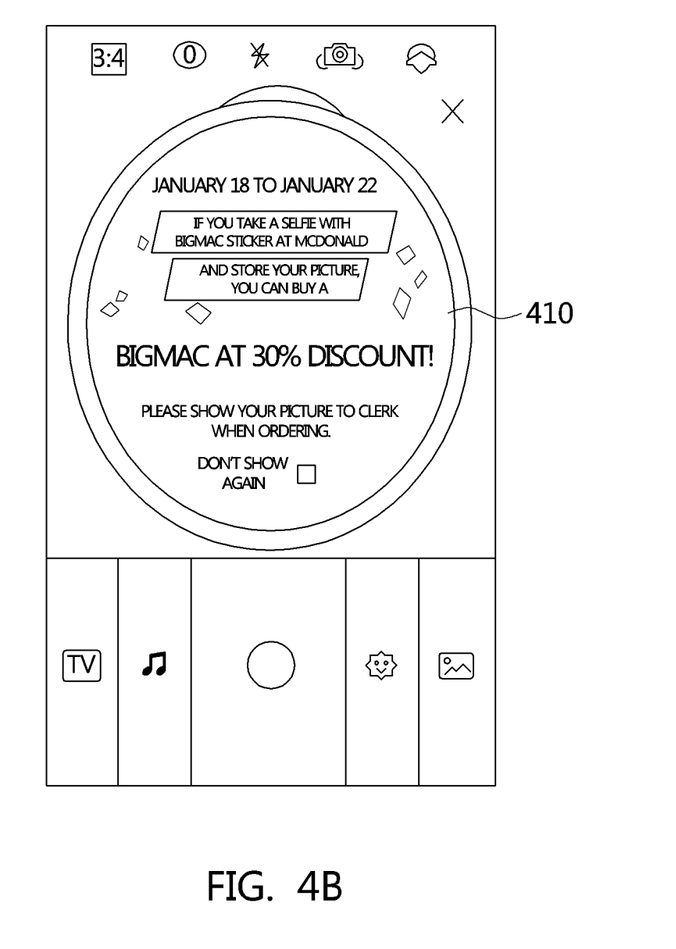

Furthermore, in the method according to the embodiment of the present invention, when a preset promotion is present in the geofence, and the geo-button 310 present on the screen of the camera application is selected by the user, as shown in FIG. 4A, a popup window 410 pertaining to the promotion in the geofence is displayed on the screen, as shown in FIG. 4B.

Although, in FIGS. 4A and 4B, a description has been made of the case where the popup window pertaining to a promotion is displayed on the screen by selecting the geo-button when a promotion for the geofence is present while the camera application is being executed, the present invention is not limited thereto. In the case where the camera application is executed using a message for entry into the geofence, which is displayed on the screen when the user device enters a geofence while the camera application is not being executed, if a promotion is present for the corresponding geofence, a popup window pertaining to the promotion may be displayed on the screen at the time at which the camera application is executed.

Figure 5A:
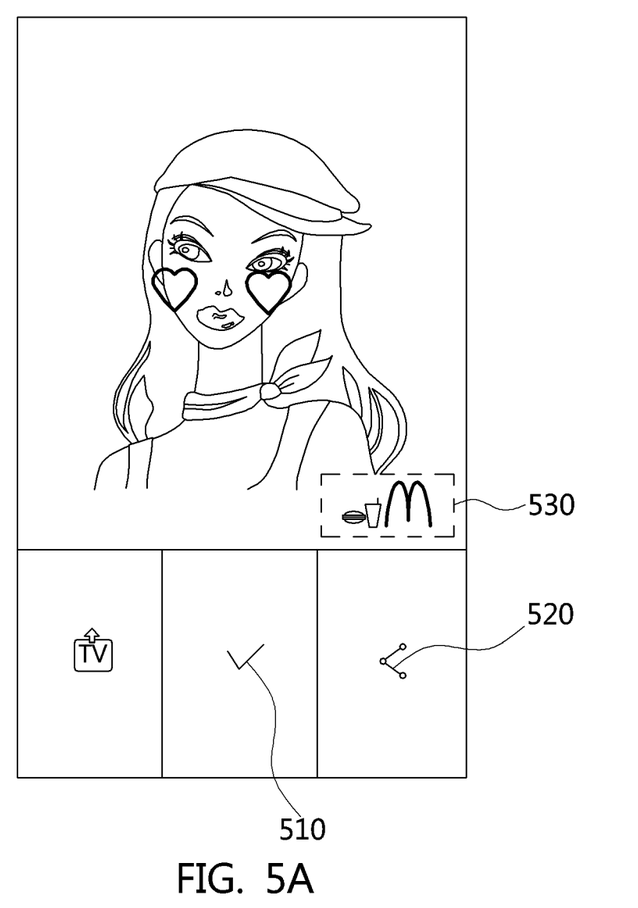
FIGS. 5A and 5B are exemplary diagrams for explaining a procedure for storing a captured image.

When the camera application downloads geo-items for the geofence, and any one of the items included in the downloaded geo-items, for example, a heart item, is applied to the subject, and thereafter an image of the subject is captured, an image in which the heart is applied to (superimposed on) a specific object in the subject, for example, a person's cheek, is generated.

The image generated in this way is displayed on the screen using a preview function, as shown in FIG. 5A, and a first watermark 530 preset for the geofence is arranged in a specific region of the generated image. A storage button 510 for storing the generated image and a share button 520 for sharing the corresponding image through at least one preset application are provided through a user interface.

Figure 5B:
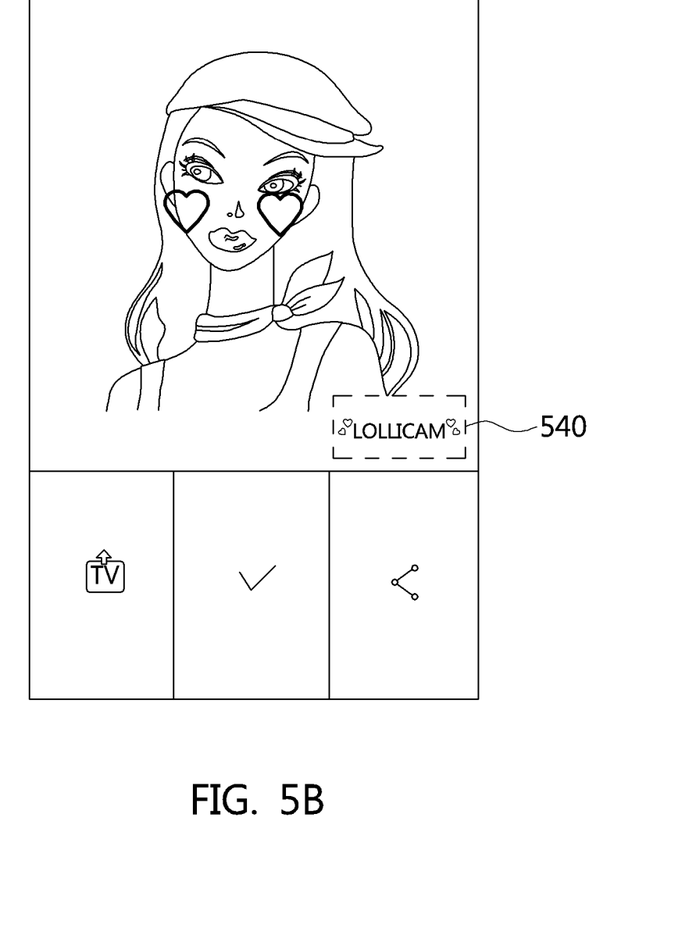

Here, when a specific region in which the first watermark 530 is arranged is touched by the user, the first watermark 530 may change to a second watermark 540 preset for the camera application, as shown in FIG. 5B. Similarly, when a specific region in which the second watermark 540 of FIG. 5B is arranged is touched by the user, the second watermark 540 may change back to the first watermark 530 of FIG. 5A.

In this way, the method according to the embodiment of the present invention may provide geo-items including at least one of a sticker and an effect corresponding to a predetermined geofence when the user device enters the geofence, and may then generate an image to which a desired geo-item for the corresponding area is applied.

Figure 7:
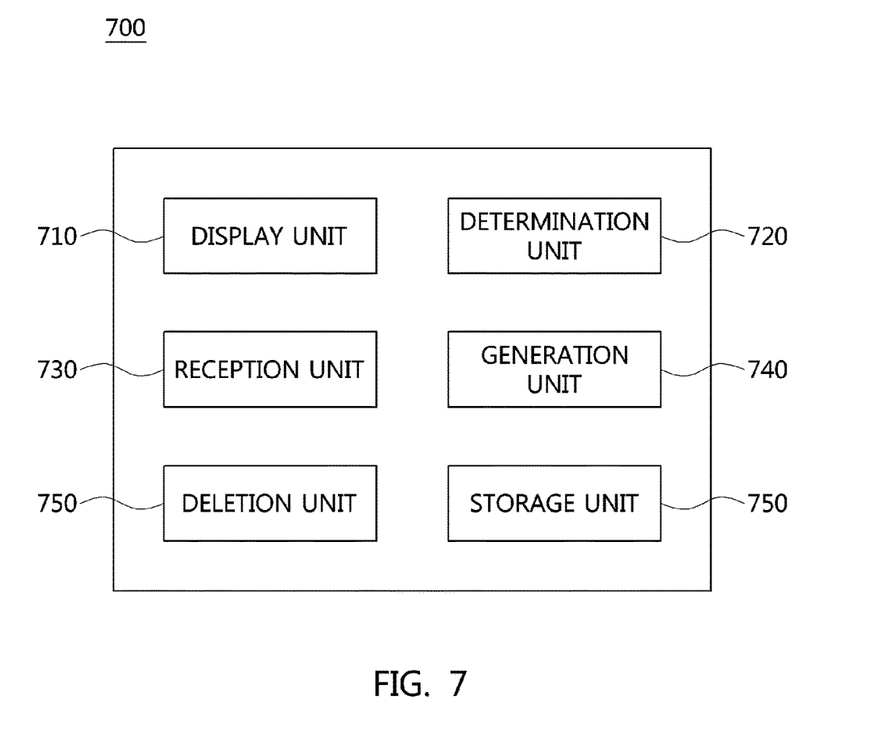
FIG. 7 is a diagram showing the configuration of an image generation apparatus according to an embodiment of the present invention.

FIG. 7 is a diagram showing the configuration of an image generation apparatus according to an embodiment of the present invention, and illustrates an apparatus for performing the image generation method, which has been described above with reference to FIGS. 2 to 6B.

An image generation apparatus 700 may be configured to be included in all devices, each equipped with a camera.

Referring to FIG. 7, the image generation apparatus 700 according to the embodiment of the present invention includes a display unit 710, a determination unit 720, a reception unit 730, a generation unit 740, a deletion unit 750, and a storage unit 760.

The display unit 710 is a means for displaying information related to the present invention. The display unit 710 according to the present invention is described as including a control means for controlling the display means. Of course, the display means and the control means for controlling the display means may be separately configured. The present invention assumes that the display unit 710 includes the two cases.

The display unit 710 displays the subject to be captured by a camera by executing the camera application of the user device.

When the image to which any one item of geo-items for a geofence (or a predetermined area) is applied is generated in response to entry into the geofence, the display unit 710 may display the image generated with the geo-item applied thereto on the screen, and may arrange a first watermark, preset for the geofence, in a specific region of the generated image and display the first watermark.

Here, when the first watermark is selected by the user's touch in the state in which the first watermark is displayed in the specific region of the generated image, the display unit 710 may change the first watermark to a second watermark, preset for the camera application, and may display the second watermark. The first watermark and the second watermark may be changed and displayed with each other depending on user input for the corresponding region, that is, the user's touch.

Further, when the user device enters a geofence in which a promotion is present and subsequently executes the camera application, the display unit 710 may display a popup window pertaining to the corresponding promotion on the screen.

Here, when a preset geo-button is selected by the user while the camera application is being executed, the display unit 710 may display a popup window pertaining to the promotion on the screen. While the camera application is not being executed, a message indicating entry into the geofence may be displayed on the screen, and a popup window pertaining to the corresponding promotion may be displayed on the screen at the time at which the camera application is executed using the message displayed on the screen.

When the camera application is not yet executed and the user device enters a geofence in the state in which the screen of the user device is turned off, the display unit 710 may display a popup message, preset for entry into the corresponding geofence, on the screen. When the camera application is not yet executed and the user device enters a geofence in the state in which the screen of the user device is turned on, the display unit 710 may display a banner message, preset for entry into the geofence, in a predetermined region on the screen.

The determination unit 720 acquires the location information of the user device and determines whether the location of the user device based on the acquired location information is present in at least one geofence.

That is, the determination unit 720 determines whether the user device has entered the geofence based on the location information of the user device.

If it is determined that the user device has entered the geofence, the reception unit 730 receives items such as stickers or effects, among geo-items preset for the geofence, from the server.

At this time, the reception unit 730 may automatically download a basic item, among the items set for the geofence, from the server while the camera application is being executed, and may determine whether to download the remaining items based on the user's selection. Of course, the reception unit 730 is not limited to a structure for downloading items included in the geo-items depending on the user's selection, and may also download the items included in the geo-items based on set information by setting the determination of whether to download items for each geofence based on automatic or manual selection.

The generation unit 740 is configured to, when any one of the items included in the geo-items downloaded by the camera application is applied to the subject depending on the user's selection, after which an image of the subject is captured, generate an image to which any one item of the geo-items is applied.

When at least one of effects basically provided by the camera application is additionally applied, the generation unit 740 may generate an image by applying the sticker or effect of the geo-items, together with the effect of a basic item, to the subject.

The image generated by the generation unit 740 may be shared through at least one preset application.

The deletion unit 750 is a component for deleting the geo-item provided from the server in the geofence, and is configured to, when a session with the corresponding geofence is terminated, delete the downloaded or received geo-item for the geofence.

When the user device exits the corresponding geofence in the state in which the camera application has been terminated, the deletion unit 750 may delete the geo-item received or downloaded through the camera application.

The storage unit 760 may store all pieces of data required to perform the present invention, for example, algorithms, applications, images to which geo-items are applied, various types of effect data, videos, and images captured in a normal mode.

Of course, it will be apparent to those skilled in the art that, in addition to these functions, the apparatus of the present invention may perform all of the functions explained in the above-described method.

The aforementioned system or apparatus may be embodied as a hardware element, a software element, and/or a combination of a hardware element and a software element. For example, the system, apparatus and elements described in embodiments may be embodied using at least one general-purpose computer or special-purpose computer such as a processor, a controller, an arithmetic logic unit (ALU), a digital signal processor, a microcomputer, a field programmable array (FPA), a programmable logic unit (PLU), a microprocessor, or another apparatus for executing and responding to an instruction. The processor may execute an operating system (OS) and at least one software application that runs on the OS. Also, the processor may access, store, operate, process, and create data in response to the execution of software. For the convenience of understanding, a single processor may be used, however, those skilled in the art may appreciate that the processor may include a plurality of processing elements and/or a plurality of processing element types. For example, the processor may include a plurality of processors or a single processor and a single controller. Further, another processing configuration such as a parallel processor is possible.

The software may include at least one of a computer program, a code and an instruction solely or in combination, configure the processor to operate as desired, or instruct the processor to operate independently or collectively. The software and/or the data may be embodied permanently or temporarily in any type of machine, component, physical equipment, virtual equipment, computer storage medium or device, or transmitted signal wave, in order to be interpreted by the processor or to provide the processor with the instructions or the data. The software may be distributed on computer systems connected over a network, and may be stored or implemented in the distributed method. The software and the data may be stored in one or more computer-readable storage media.

The methods according to the above embodiments may be implemented as program instructions that can be executed by various computer means and may be recorded on a computer-readable storage medium. The computer-readable storage medium may include program instructions, data files, and data structures, either solely or in combination. Program instructions recorded on the storage medium may have been specially designed and configured for the embodiments of the present invention, or may be known to or available to those who have ordinary knowledge in the field of computer software. Examples of the computer-readable storage medium include all types of hardware devices specially configured to record and execute program instructions, such as magnetic media such as a hard disk, a floppy disk, and magnetic tape, optical media such as compact disk (CD)-read only memory (ROM) and a digital versatile disk (DVD), magneto-optical media such as a floptical disk, ROM, random access memory (RAM), and flash memory. Examples of the program instructions include machine language code, such as code created by a compiler, and high-level language code executable by a computer using an interpreter. The hardware devices may be configured to operate as one or more software modules in order to perform the operation of the present invention, and vice versa.

In accordance with the embodiments of the present invention, when a user device enters a predetermined area (geofence), geo-items including at least one of stickers and effects corresponding to the area are provided, and thus images to which the geo-items for the corresponding area are applied may be generated.

For example, when an area corresponding to Lotte World, which is a major recreation complex, is set as a geofence, and a user device in which the camera application according to the present invention is installed enters Lotte World, geo-items including stickers and effects, preset for Lotte World, are provided from the server. Accordingly, the stickers or effects corresponding to Lotte World may be applied when images are captured, and thus the images to which the stickers or effects corresponding to Lotte World are applied may be generated.

Although the present invention has been shown and described with reference to limited embodiments and the accompanying drawings, it will be appreciated by those skilled in the art that various changes and modifications may be made from the above descriptions. For example, even if the aforementioned technologies are carried out in an order differing from the one described above and/or illustrated elements, such as systems, structures, devices and circuits, are combined or united in forms differing from those described above or are replaced or substituted with other elements or equivalents, the same results may be achieved.

Accordingly, it should be noted that other implementations, other embodiments, and equivalents of the accompanying claims also fall within the scope of the accompanying claims.

What is claimed is:

1. An image generation method, comprising:
   displaying a subject to be captured by a camera by executing a camera application on a user device;
   acquiring information about a location of the user device and determining whether the location of the user device based on the acquired location information is present in a predetermined area;
   if it is determined that the location of the user device is present in the predetermined area, receiving geo-items including at least one of a sticker and an effect corresponding to information about the predetermined area from a server; and
   when an image including the subject is captured using any one item included in the received geo-items, generating an image to which the one item is applied.

2. The image generation method of claim 1, further comprising, when the image to which the one item is applied is generated, applying a first watermark, preset for the predetermined area information, to a specific region of the generated image and displaying the first watermark on a screen.

3. The image generation method of claim 2, further comprising, when the first watermark displayed in the specific region is selected by user input, changing the first watermark to a second watermark, preset for the camera application, and displaying the second watermark,
   wherein the first watermark and the second watermark are changed to each other and then displayed based on user input made in the specific region.

4. The image generation method of claim 1, further comprising, when the user device exits the predetermined area in a state in which execution of the camera application has been terminated, deleting the received geo-items.

5. The image generation method of claim 1, further comprising, when the location of the user device is present in the predetermined area and a promotion corresponding to the predetermined area information is present, displaying a popup window pertaining to the promotion on a screen.

6. The image generation method of claim 1, wherein the image to which the one item is applied is capable of being shared through at least one preset application.

7. The image generation method of claim 1, wherein:
   receiving the geo-items is configured to, when a preset geo-button is selected by the user, display items included in the geo-items which are capable of being downloaded from the server, and download an item selected by the user from among the displayed items from the server, and
   generating the image is configured to, when any one of the downloaded items is selected by the user, generate an image to which the selected item is applied by applying the selected item to the subject.

8. An image generation method, comprising:
   acquiring information about a location of a user device, without a camera application being executed;

when the user device is found to enter an area, predetermined for the camera application, based on the acquired location information, displaying a message indicating entry into the predetermined area on a screen;

when the camera application is executed using the message, receiving geo-items including at least one of a sticker and an effect corresponding to information about the predetermined area from a server; and when an image including a subject is captured using any one item included in the received geo-items, generating an image to which the one item is applied.

9. The image generation method of claim 8, wherein displaying the message on the screen is configured to, when the screen of the user device is in an off state, display a popup message, preset for the predetermined area information, on the screen, and when the screen of the user device is in an on state, display a banner message, preset for the predetermined area information, in a predetermined region on the screen.

10. The image generation method of claim 8, further comprising, if the camera application is executed using the message when a promotion corresponding to the predetermined area information is present, displaying a popup window pertaining to the promotion on the screen.

11. An image generation apparatus, comprising:
a display unit for displaying a subject to be captured by a camera by executing a camera application on a user device;
a determination unit for acquiring information about a location of the user device and determining whether the location of the user device based on the acquired location information is present in a predetermined area;
a reception unit for, if it is determined that the location of the user device is present in the predetermined area, receiving geo-items including at least one of a sticker and an effect corresponding to information about the predetermined area from a server; and
a generation unit for, when an image including the subject is captured using any one item included in the received geo-items, generating an image to which the one item is applied.

12. The image generation apparatus of claim 11, wherein the display unit is configured to, when the image to which the one item is applied is generated, apply a first watermark, preset for the predetermined area information, to a specific region in the generated image, and display the first watermark on a screen.

13. The image generation apparatus of claim 12, wherein:
the display unit is configured to, when the first watermark displayed in the specific region is selected by user input, change the first watermark to a second watermark, preset for the camera application, and display the second watermark, and
the first watermark and the second watermark are changed to each other and then displayed based on user input made in the specific region.

14. The image generation apparatus of claim 11, further comprising a deletion unit for, when the user device exits the predetermined area in a state in which execution of the camera application has been terminated, deleting the received geo-items.

15. The image generation apparatus of claim 11, wherein the display unit is configured to, when the location of the user device is present in the predetermined area and a promotion corresponding to the predetermined area information is present, display a popup window pertaining to the promotion on a screen.

16. The image generation apparatus of claim 11, wherein the image to which the one item is applied is capable of being shared through at least one preset application.

17. The image generation apparatus of claim 11, wherein the display unit is configured to, when the user device enters the predetermined area while the camera application is not being executed, display a message indicating entry into the predetermined area on the screen.

18. The image generation apparatus of claim 17, wherein the display unit is configured to, when the screen of the user device is in an off state, display a popup message, preset for the predetermined area information, on the screen, and when the screen of the user device is in an on state, display a banner message, preset for the predetermined area information, in a predetermined region on the screen.

19. The image generation apparatus of claim 11, wherein:
the reception unit is configured to, when a preset geo-button is selected by the user, display items included in the geo-items which are capable of being downloaded from the server, and download an item, selected by the user from among the displayed items, from the server, and
the generation unit is configured to, when any one of the downloaded items is selected by the user, generate an image to which the selected item is applied by applying the selected item to the subject.

* * * * *

UNITED STATES PATENT AND TRADEMARK OFFICE
CERTIFICATE OF CORRECTION

PATENT NO. : 10,038,852 B2  
APPLICATION NO. : 15/338364  
DATED : July 31, 2018  
INVENTOR(S) : Jae Cheol Kim Page 1 of 1

It is certified that error appears in the above-identified patent and that said Letters Patent is hereby corrected as shown below:

On the Title Page

In Item (73), under "Assignee", in Column 1, Line 1, delete "SEERSLAB INC." and insert -- SEERSLAB, INC. --, therefor.

Signed and Sealed this
Twenty-fifth Day of September, 2018

Andrei Iancu
*Director of the United States Patent and Trademark Office*